United States Patent
Kweon et al.

(10) Patent No.: US 12,348,958 B2
(45) Date of Patent: Jul. 1, 2025

(54) METHOD AND APPARATUS RETRIEVING AND SELECTING SERVER FOR TERMINAL AUTHENTICATION AND SUBSCRIBER DATA TRANSMISSION

(71) Applicant: SAMSUNG ELECTRONICS CO., LTD., Suwon-si (KR)

(72) Inventors: Kisuk Kweon, Suwon-si (KR); Sangjun Moon, Suwon-si (KR); Jungshin Park, Suwon-si (KR); Youngkyo Baek, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 17/999,541

(22) PCT Filed: May 20, 2021

(86) PCT No.: PCT/KR2021/006264
§ 371 (c)(1),
(2) Date: Nov. 21, 2022

(87) PCT Pub. No.: WO2021/235857
PCT Pub. Date: Nov. 25, 2021

(65) Prior Publication Data
US 2023/0209339 A1    Jun. 29, 2023

(30) Foreign Application Priority Data
May 21, 2020  (KR) .................. 10-2020-0061211

(51) Int. Cl.
*H04W 12/06*    (2021.01)
*H04W 8/20*     (2009.01)
(Continued)

(52) U.S. Cl.
CPC ............. *H04W 12/06* (2013.01); *H04W 8/20* (2013.01); *H04W 48/18* (2013.01); *H04W 84/105* (2013.01)

(58) Field of Classification Search
CPC ....... H04W 12/06; H04W 8/20; H04W 48/18; H04W 84/105; H04W 4/70; H04W 8/205; H04W 4/50; H04L 61/3025
See application file for complete search history.

(56) References Cited

U.S. PATENT DOCUMENTS

| 2003/0033209 A1 | 2/2003 | Minear et al. |
| 2020/0053083 A1 | 2/2020 | Kunz et al. |
| 2021/0058784 A1* | 2/2021 | Kedalagudde ........ H04W 76/12 |

FOREIGN PATENT DOCUMENTS

| CN | 111182543 A | 5/2020 |
| WO | 2020072657 A1 | 4/2020 |

OTHER PUBLICATIONS

3GPP TSG-SA3 Meeting #102-e, Intel, Source to UE onboarding for non-public networks, Jan. 18-29, 2020, pp. 1-6 (Year: 2020).*
(Continued)

*Primary Examiner* — Brandon J Miller (57) ABSTRACT

The present disclosure relates to: a communication technique merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. A terminal in a wireless communication system according to one embodiment of the present invention can select a server of an onboarding stand-alone non-public network (SNPN).

14 Claims, 5 Drawing Sheets

(51) Int. Cl.
*H04W 48/18* (2009.01)
*H04W 84/10* (2009.01)

(56) References Cited

OTHER PUBLICATIONS

International Search Report and Written Opinion of the International Searching Authority dated Sep. 2, 2021, in connection with International Application No. PCT/KR2021/006264, 9 pages.
Ericsson, "User Plane based solution to onboarding KI#4," 3GPP TSG-SA WG2 Meeting #136AH, S2-2000192, Jan. 13-17, 2020, Incheon, South Korea, 7 pages.
3GPP TR 23.700-07 V0.23.0 (Dec. 19, 2020); Technical Report; 3rd Generation Partnership Project; Technical Specification Group Services and System Aspects; Study on enhanced support of Non-Public Networks (Release 17); 43 pages.
Intel, "Solution for UE Onboarding and provisioning for an SNPN," 3GPP TSG-SA WG2 Meeting #136AH, 62-2001533, Jan. 13-17, 2020, Incheon, South Korea, 6 pages.
Supplementary European Search Report dated Oct. 4, 2023, in connection with European Patent Application No. 21808018.2, 13 pages.
Rapporteur—Alibaba et al., "Notes from Conference Call May 13: FS_eNPN- SA2 Open Issues related to KI#I and KI#4 and questions for resolving the open issues—moderated e-mail discussion," May 2020, 59 pages.
Communication pursuant to Article 94(3) EPC Report dated Jun. 25, 2024, in connection with European Patent Application No. 21808018.2, 6 pages.

\* cited by examiner

METHOD AND APPARATUS RETRIEVING AND SELECTING SERVER FOR TERMINAL AUTHENTICATION AND SUBSCRIBER DATA TRANSMISSION

CROSS-REFERENCE TO RELATED APPLICATIONS

This application is a 371 of International Application No. PCT/KR2021/006264 filed May 20, 2021, which claims priority to Korean Patent Application No. 10-2020-0061211 filed May 21, 2020, the disclosures of which are herein incorporated by reference in their entirety.

BACKGROUND

1. Field

The disclosure relates to a communication system, and more particularly, to a method of detecting and selecting a server for user equipment (UE) authentication and subscription data transmission to receive subscription data in a non-public network (NPN) by a UE.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Compared to the legacy 4G system, the 5G system considers to support various services. For example, the key services may include enhanced mobile broadband (eMBB), ultra-reliable and low latency communication (URLLC), massive machine type communication (mMTC), evolved multimedia broadcast/multicast service (eMBMS), and so on. A system supporting the URLLC service and a system supporting the eMBB service may be referred to as a URLLC system and an eMBB system, respectively. The terms service and system are interchangeably used with each other.

The URLLC service is a new service under consideration in the 5G system, unlike the legacy 4G system, and requires ultra-high reliability (e.g., a packet error rate of about $10^{-5}$) and low latency (e.g., about 0.5 msec) relative to other services. To satisfy these strict requirements, the URLLC service may need a shorter transmission time interval (TTI) than the eMBB service, and various operation schemes using the short TTI are considered.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As such, various services are available owing to the development of mobile communication systems. Accordingly, there is a need for a method of efficiently using a non-public network (NPN) to provide such various services in places such as factories, schools, and companies using their own networks.

SUMMARY

The disclosure is intended to provide a method and apparatus for detecting and selecting a server for user equipment (UE) authentication and subscription data transmission in a non-public network (NPN).

According to an embodiment of the disclosure, a method of selecting a server by a first stand-alone non-public network (SNPN) to which a user equipment (UE) is onboarding in a wireless communication system includes receiving a network access identifier configured as a unique identifier of the UE from the UE, selecting a default credential server based on address information about the default credential server included in the network access identifier, and receiving address information about a provisioning server selected by the default credential server from the default credential server.

The method may further include selecting a session management function (SMF) and a user plane function (UPF) corresponding to the provisioning server selected by the default credential server.

The method may further include transmitting an authentication request including authentication information about the UE to the default credential server, and receiving a response indicating success of authentication of the UE from the default credential server.

The method may further include receiving identification information about a second SNPN to serve the UE from the default credential server.

According to an embodiment of the disclosure, an operation method of a UE for enabling a first SNPN to which the UE is onboarding to select a server in a wireless communication system includes transmitting a network access identifier configured as a unique identifier of the UE to the first SNPN, and performing a UE authentication procedure with a provisioning server selected by a default credential server corresponding to address information included in the network access identifier.

The operation method may further include receiving information about a second SNPN to serve the UE from the provisioning server.

According to an embodiment, an SMF and a UDF corresponding to the provisioning server selected by the default credential server may be selected.

According to an embodiment of the disclosure, an SNPN to which a UE is onboarding, for selecting a server in a wireless communication system includes a transceiver, and a controller controlling to receive a network access identifier configured as a unique identifier of the UE from the UE, selecting a default credential server based on address information about the default credential server included in the network access identifier, and controlling to receive address information about a provisioning server selected by the default credential server from the default credential server.

According to an embodiment of the disclosure, an operation method of a UE onboarding to an SNPN selecting a server in a wireless communication system includes a transceiver, and a controller controlling to transmit a network access identifier configured as a unique identifier of the UE to the first SNPN, and performing a UE authentication procedure with a provisioning server selected by a default credential server corresponding to address information included in the network access identifier.

A method and apparatus according to an embodiment of the disclosure may effectively select a server for user equipment (UE) authentication and subscription data transmission in a wireless communication system.

DETAILED DESCRIPTION

Embodiments of the disclosure are described below in detail with reference to the accompanying drawings. It should be noted that like reference numerals denote the same components in the drawings. Further, a detailed description of a generally known function or structure of the disclosure will be avoided lest it should obscure the subject matter of the disclosure.

In describing embodiments of the disclosure, a description of technical ideas which are well known in the technical field to which the disclosure pertains and are not directly related to the disclosure will be omitted. This is intended to make the subject latter of the disclosure more clear by omitting the unnecessary description.

For the same reason, some components are exaggerated, omitted, or schematically illustrated in the drawings. The drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification. Like reference numerals denote the same components throughout the specification.

It will be understood that each block of the flowchart illustrations and block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function/act specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card.

In embodiments of the disclosure, a base station (BS), which is an entity to allocate resources to a user equipment (UE), may be at least one of a Node B, a evolved Node B (eNode B or eNB), a next generation Node B (gNode B or gNB), a radio access unit, a base station controller (BSC), or a network node.

A terminal may include a UE, a mobile station (MS), a cellular phone, a smart phone, a computer, or a multimedia system capable of executing a communication function. Embodiments of the disclosure described below are applicable to other communication systems having a similar technical background or channel structure. Further, the disclosure is also applicable to other communication systems through some modifications without greatly departing from the scope of the disclosure as judged by those skilled in the art.

Terms identifying access nodes, terms signifying network entities or network functions (NFs), terms signifying messages, terms signifying interfaces between network entities, and terms signifying various types of identification information as used in the following description are given for convenience of description. Accordingly, the disclosure is not limited to the terms described below, and the terms may be replaced by other equivalent terms in technical meanings.

For convenience of description, some of terms and names defined in the 3$^{rd}$ generation partnership project (3GPP) long term evolution (LTE) and/or 3GPP new radio (NR) standards. However, the disclosure is not limited by the above terms and names, and may be equally applied to systems conforming to other standards.

Embodiments of the disclosure will be described below with reference to the attached drawings.

Figure 1:
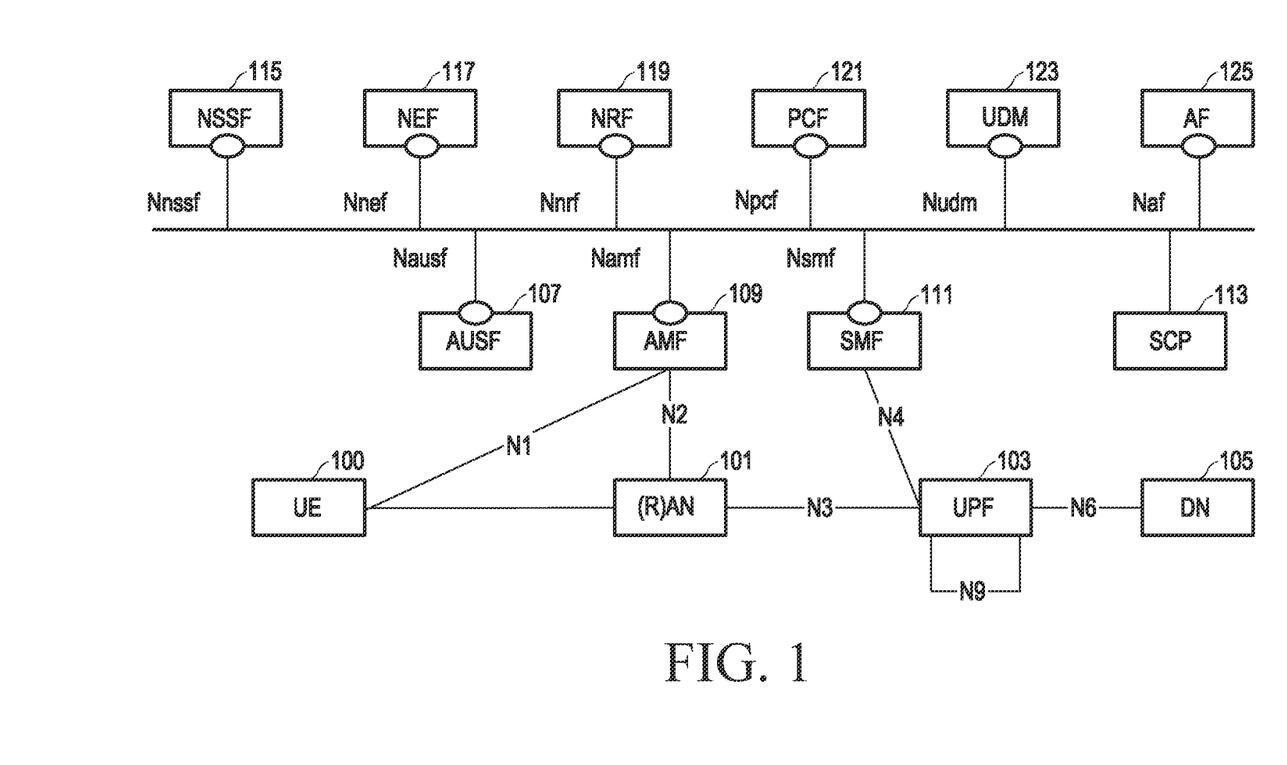
FIG. 1 is a diagram illustrating the structure of a $5^{th}$ generation (5G) network according to an embodiment of the disclosure.

FIG. 1 illustrates the structure of a 5G network according to an embodiment of the disclosure. Network entities or network nodes included in the 5G network will be described below.

Referring to FIG. 1, a wireless communication system that forms the 5G network may include a UE 100 and a plurality of network entities 101 to 125.

A (radio) access network ((R)AN) 101, which is an entity allocating radio resources to the UE 100, may be at least one of an eNode B, a gNode B, a Node B, a BS, a next generation radio access network (NG-RAN), a 5G-AN, a radio access unit, a BTS, or a network node.

The UE 100 may be at least one of a user equipment, a next generation (NG) UE, an MS, a cellular phone, a smartphone, or a computer. Further, the UE 100 may include a multimedia system capable of executing a communication function.

While an embodiment of the disclosure is described in the context of a 5G system by way of example, the embodiment of the disclosure may be applied to other communication systems having a similar technical background. Further, the disclosure is also applicable to other communication systems through some modifications without greatly departing from the scope of the disclosure as judged by those skilled in the art.

As the wireless communication system evolves from a 4G system to a 5G system, a new core network, nextgen core (NG core) or 5G core network (5GC) is defined. The new core network virtualizes all the existing network entities (NEs) into network functions (NFs). According to an embodiment of the disclosure, an NF may mean a network entity, a network component, and a network resource.

According to an embodiment of the disclosure, the 5GC may include NFs illustrated in FIG. 1. Obviously, the 5GC may include more or fewer NFs than the NFs illustrated in FIG. 1, not limited to the example of FIG. 1.

According to an embodiment of the disclosure, an access and mobility management function (AMF) 109 may be an NF that manages the mobility of a UE.

According to an embodiment of the disclosure, a session management function (SMF) 111 may be an NF that manages a packet data network (PDN) connection provided to the UE. The PDN connection may be referred to as a protocol data unit (PDU) session.

According to an embodiment of the disclosure, a policy control function (PCF) 121 may be an NF that applies a service policy, a charging policy, and a policy for a PDU session of a mobile communication operator to the UE.

According to an embodiment of the disclosure, a unified data management (UDM) 123 may be an NF that stores information about a subscriber.

According to an embodiment of the disclosure, an application function (AF) may be an application function operated by a UE manufacturer, a service provider, or a public land mobile network (PLMN) operator. However, even if the AF is not an application function operated by the UE manufacturer, it may mean another application function managing the wireless capability and wireless capability identifier (ID) of the UE.

According to an embodiment of the disclosure, a service communication proxy (SCP) 113 may relay communication with an appropriate NF to NFs by serving as a proxy server when delivering a 5G core service.

According to an embodiment of the disclosure, a network exposure function (NEF) 117 may be a function of providing information about the UE to a server outside the 5G network. In addition, the NEF 117 may provide a function of providing information required for a service to the 5G network and storing the information in a unified data repository (UDR).

According to an embodiment of the disclosure, a user plane function (UPF) 103 may be a function that serves as a gateway transmitting user data (a PDU) to a data network (DN) 105.

According to an embodiment of the disclosure, a network repository function (NRF) 119 may perform a function of discovering an NF.

According to an embodiment of the disclosure, an authentication server function (AUSF) 107 may perform UE authentication in a 3GPP access network and a non-3GPP access network.

According to an embodiment of the disclosure, a network slice selection function (NSSF) 115 may perform a function of selecting a network slice instance provided to the UE.

According to an embodiment of the disclosure, the DN 105 may be a data network through which the UE 100 transmits and receives data in order to use a service of a network operator or a $3^{rd}$ party service.

Figure 2:
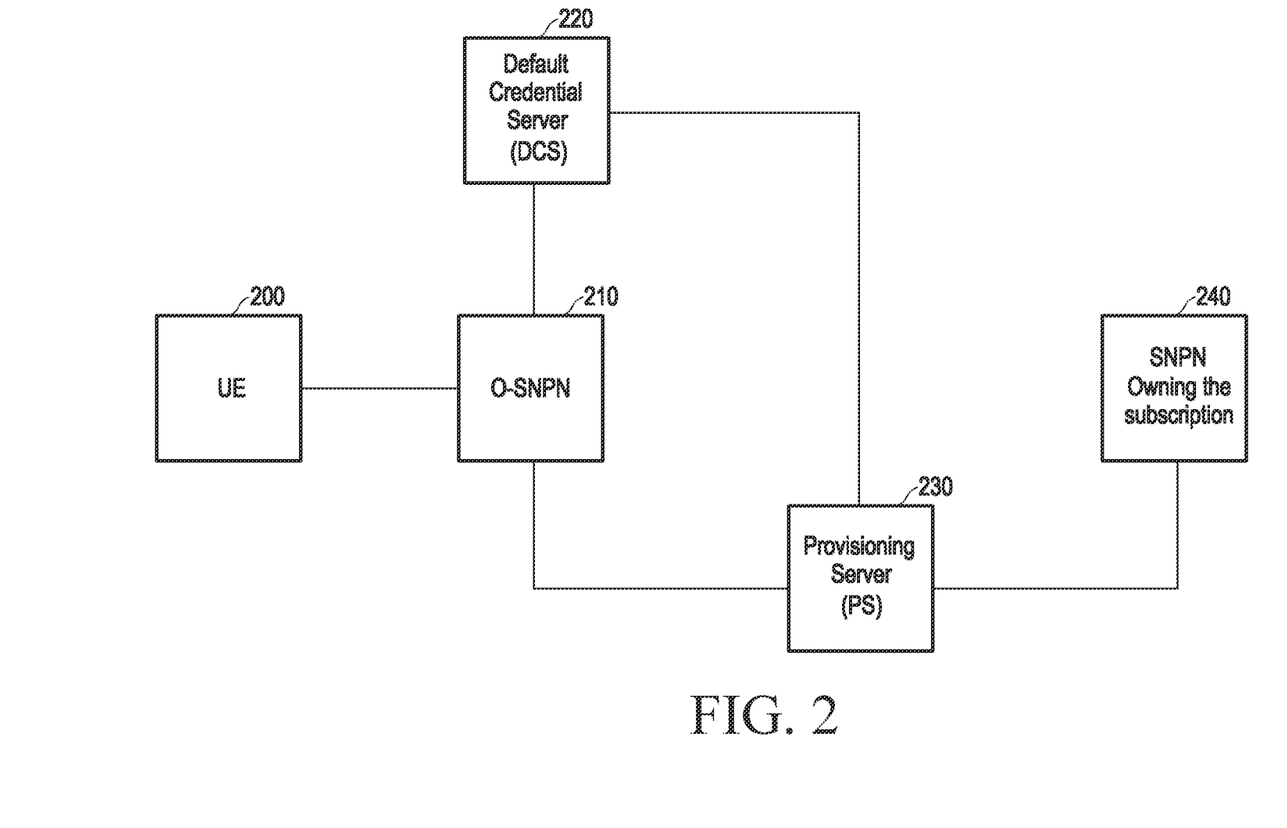
FIG. 2 is a diagram illustrating entities for transmitting a user subscription to a user equipment (UE) according to an embodiment of the disclosure.

FIG. 2 is a diagram illustrating entities for transmitting a user subscription to a UE according to an embodiment of the disclosure.

Referring to FIG. 2, a wireless communication system for transmitting a user subscription to a UE may include a UE 200, an onboarding stand-alone non-public network (O-SNPN) 210, a default credential server (DCS) 220, a provisioning server (PS) 230, and an SNPN 240 that keeps user subscription data.

First, it is assumed that the UE 200 does not have user subscription data, and has a default UE credential allocated by the DCS 220. In addition, the DCS 220 may allocate a unique UE ID uniquely identifying the UE 200 to the UE 200.

The O-SNPN 210 may provide user plane (UP)-based Internet protocol (IP) connectivity (UE onboarding) or control plane (CP)-based non-access stratum (NAS) connectivity (UE onboarding) to the UE 200 so that the UE 200 without the user subscription data may download the user subscription data. To determine whether to provide the onboarding service to the UE 200, the DCS 220 may receive a UE authentication request.

The DCS 220 may pre-configure the default UE credential and the unique UE ID for the UE 200 and store this information. The DCS 220 may receive a request for authentication of the UE 200 from the O-SNPN 210, when performing UE registration for onboarding. The UE 200 is authenticated using the default UE credential.

Further, when the PS 230 transmits subscription data to the UE 200, the DCS 220 may receive an authentication/authorization request for the UE 200 from the PS 230 to determine whether the UE is authorized to receive the subscription data. The DCS 220 may be a manufacturer of the UE 200 or a $3^{rd}$ party connected to the manufacturer or an SNPN operator.

The PS 230 may receive user subscription data such as a network credential and user configuration information from a network operator and transmit the user subscription data to the UE 200.

The PS 230 together with the DCS 220 may exist as one server. Like the DCS 220, the PS 230 may be a server owned by a $3^{rd}$ party connected to the manufacturer of the UE or the SNPN operator. The PS 230 may communicate with the DCS 220 for authentication/authorization of the UE 200.

The SNPN 240 having the user subscription data may transmit the user subscription data to the UE 200 through the PS 230. In this case, the network operator may have UE ID information about UEs to which user subscription data is to be transmitted.

Figure 3A:
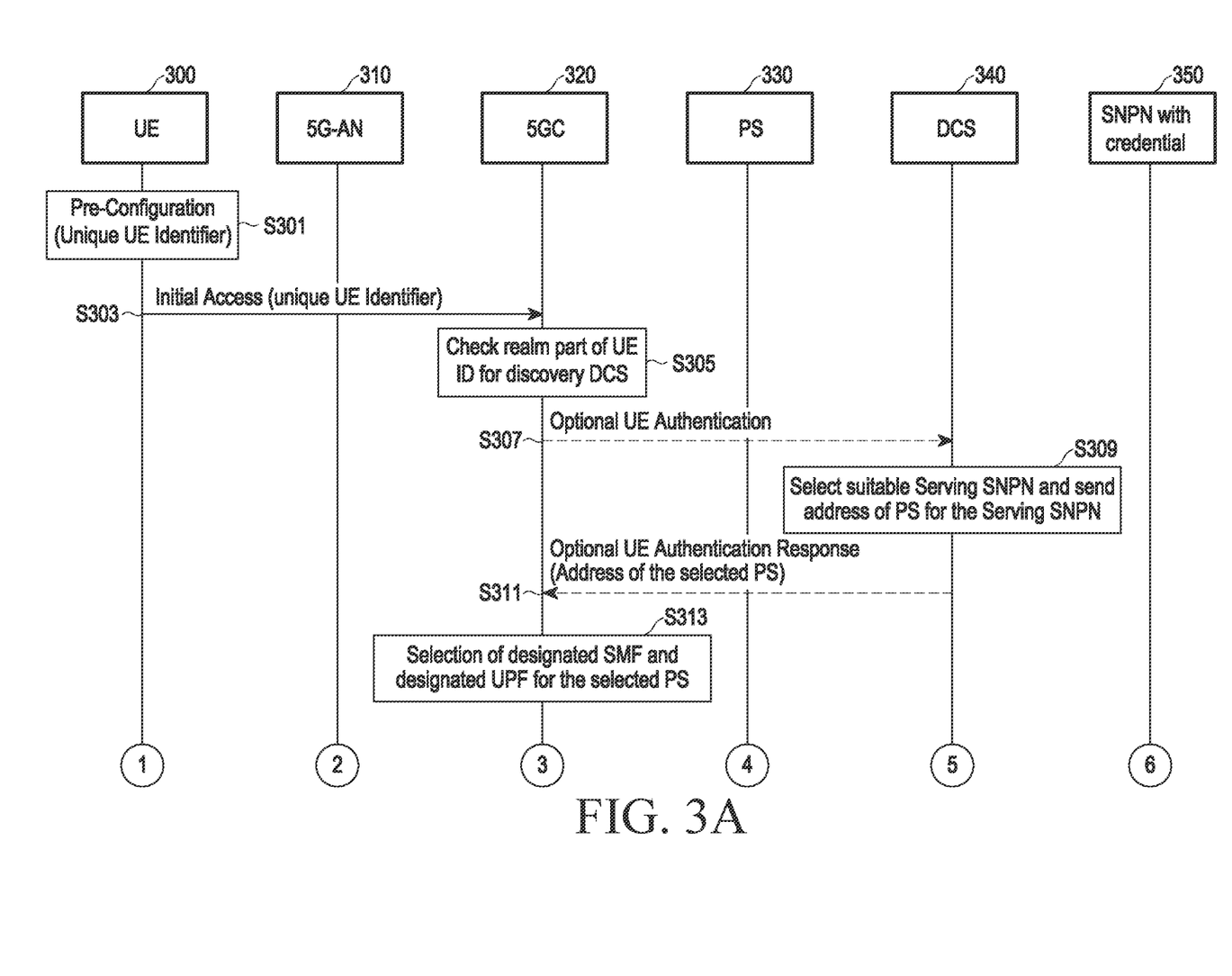
FIGS. 3a and 3b are diagrams illustrating a UE onboarding procedure for user subscription data reception of a UE according to an embodiment of the disclosure.
Figure 3B:
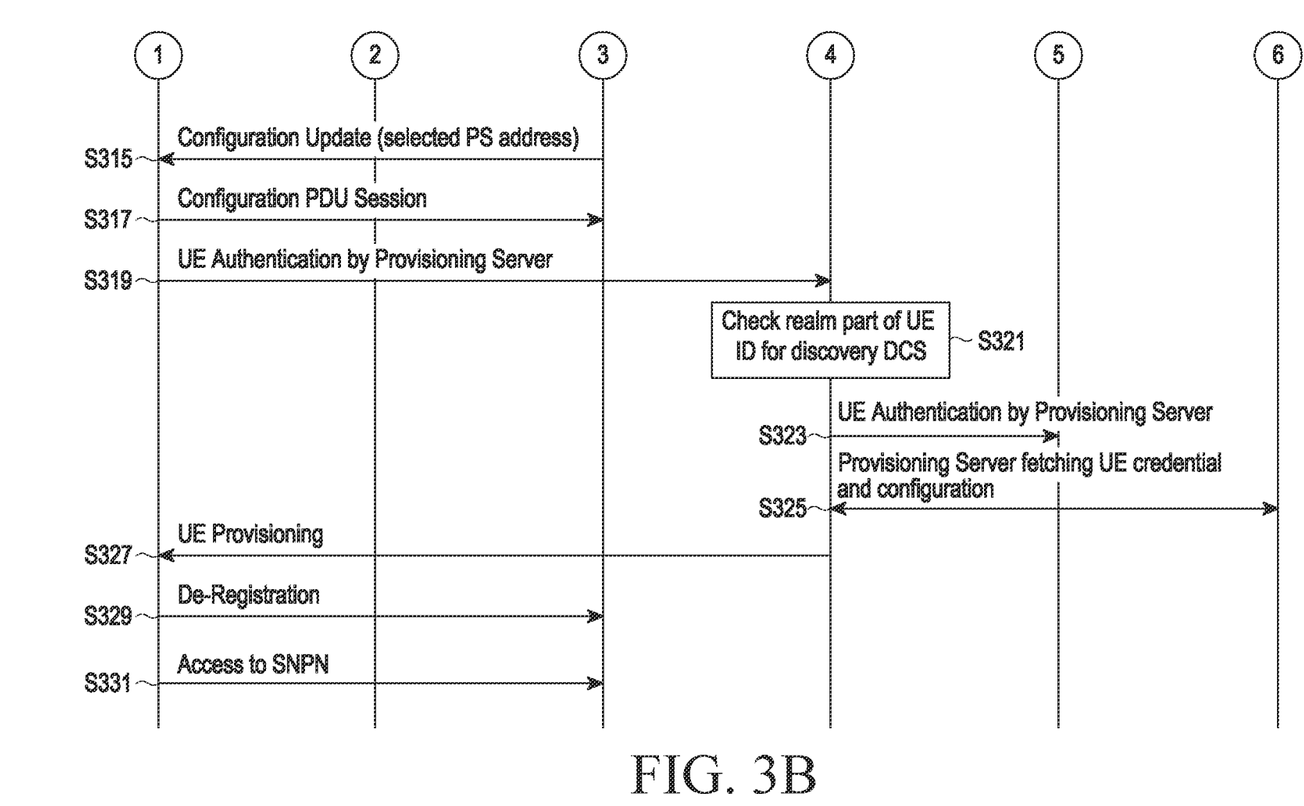

FIGS. 3a and 3b illustrate a UE onboarding procedure for user subscription data reception of a UE according to an embodiment of the disclosure.

Referring to FIG. 3a, a wireless communication system for performing the UE onboarding procedure may include a UE 300, a 5G-AN 310, a 5GC 320, a PS 330, a DCS 340, and a serving network 350.

The 5G-AN 310 performs radio resource allocation for the UE 300 and transmits system information to the UE 300. Further, the 5GC 320 may be implemented as an SNPN, and the serving network 350 may be implemented as a network (NPN or PLMN) that keeps user subscription data (a network credential and configuration information).

In step S301, the UE 300 is pre-configured with a default UE credential and a unique UE ID allocated by the DCS 340. Although the default UE credential is configured for the UE 300, a network credential is not configured for the UE 300. The network credential may be provided to the UE 300 as part of the onboarding procedure.

According to an embodiment, when there is an agreement between a UE manufacturer and the SNPN, the UE 300 may have an initial default configuration (e.g., PLMN ID and NIF of SNPN, S-NSSAI, DNN, and so on).

The UE ID allocated by the DCS 340 should uniquely identify the UE 300. A manufacturer of the UE, mainly an Internet of things (IoT) device or a $3^{rd}$ party connected to some manufacturers is highly likely to be in charge of the DCS 340.

To allocate a unique ID to a UE without a specific standard organization, the UE ID may include information about the DCS 340. To allocate a unique ID to the UE 300, it is proposed to use a UE ID in the form of a network access identifier (NAI) including the information about the DCS 340 in the disclosure.

The NAI is in the form of "user@realm", and the information about the DCS 340 may be included in the realm to enable an onboarding network to identify a server to be selected for authentication of the corresponding UE from among a plurality of DCSs. Particularly, since an address of the DCS server may be included in realm information, DCS discovery/addressing may be performed at once.

In step S303, upon initial access, the UE 300 may detect and select an O-SNPN based on the received broadcast system information. The O-SNPN is not necessarily the same as the SNPN having the network credential.

The UE 300 may transmit the unique UE ID and the default UE credential of the UE 300 to the SNPN 320 during the initial access because there is no subscription data for the SNPN 320. The UE 300 may transmit additional information such as an application ID or a service provider ID to the SNPN 320.

In the disclosure, the UE 300 may use the NAI including the information about the DCS 340 as the unique UE ID of the UE 300. The UE 300 may transmit the NAI including the information about the DCS 340 to the SNPN 320.

In step S305, the SNPN 320 may receive the unique UE ID of the UE 300 in the form of the NAI, and detect and select the DCS 340 by using the realm information included in the NAI. Particularly, since the realm information may include uniform resource locator (URL) information about the DCS 340, the SNPN 320 may transmit a UE authentication message for UE authentication to the DCS 340.

Further, since the DCS 340 is likely to make a contract with a specific SNPN for the onboarding service of its UE, the SNPN 320 may determine whether to provide connectivity for onboarding to the UE through the realm information included in the NAI.

In step S307, the SNPN 320 may transmit the unique UE ID and the default UE credential of the UE to the DCS 340 managing the UE 300, thereby requesting authentication of the UE 300 as to whether the UE 300 is allowed to access the network for onboarding purposes. The authentication may be performed by selecting either primary authentication or network slice specific authentication and authorization (NSSAA).

In step S309, the DCS 340 may perform authentication for the UE 300, and when the authentication is successful, receive subscription data from the SNPN 350 having the subscription data that the UE 300 is to receive, and select the PS 330 to transmit the subscription data to the UE 300. In this case, the DCS 340 has a list of SNPNs which the UE manufacturer has made a contract with and subscribed to, selects the most appropriate network from among the contracted SNPNs in consideration of the type and current location of the UE, and selects the PS 330 supporting the network. Like the SNPNs, the PS 300 capable of supporting the selected SNPN may be selected from a list of PSs contracted with the manufacturer. According to an embodiment, when there are multiple selected serving networks, priority information may also be included.

In step S311, the DCS 340 may transmit a response indicating success of the UE authentication, address information about the selected PS 300, and the ID (PLMN ID or PLMN ID+NID) of the selected serving network 350 to the onboarding network 320.

In step S313, the onboarding network 320 should select an SMF and a UPF to create a PDU session that will provide the UE 300 with a restricted data connection accessible only to the selected PS 330. For this purpose, the onboarding network 320 uses the address of the selected PS received from the DCS 340.

Referring to FIG. 3b, in step S315, the onboarding network 320 may transmit, to the UE 300, the address of the selected PS and S-NSSAI/DNN information for creating the PDU session, received from the DCS 340. The UE 300 may create the PDU session by using the received S-NSSAI/DNN information and transmit data to the PS 330 by using the address information about the PS 330. PS-related information may be updated in the UE, when it is different from information stored during pre-configuration.

In step S317, the UE 300 may create a configuration PDU session. The PDU session is created by using a well-known or pre-configured S-NSSAI/DNN or the S-NSSAI/DNN information received from the DCS 340.

In steps S319 to S323, the subscription data may be requested from the PS 330 by using information pre-configured in the UE 300 at an application level, or using the address information about the selected PS received from the DCS 340. The PS 330 may identify the realm part of the unique UE ID information about the UE, and request UE authentication by transmitting the default UE credential of the UE 300 to the DSC 340. In this case, the UE 300 may also transmit the serving network ID (PLMN ID or PLMN ID+NID) and the serving network priority information received from the DCS 340.

In step S325, the PS 330 may request and receive, from the serving network 350, other UE configuration parameters (e.g. PDU session parameters, such as SNSSAI, DNN, URSPs, QoS rules, and other required parameters to access the SNPN and establish a regular PDU session) as well as network credentials for the future SNPN owning the subscription.

In step S327, the PS 330 may transmit the data received from the serving network 350 in step S325 to the UE 300.

When receiving the data successfully in step S327, the UE 300 may release the configuration PDU session of the onboarding network 320 and perform deregistration with the onboarding network 320 in step S329.

In step S331, the UE 300 may receive a network service by registering to the serving network 350 using the received subscription data. The onboarding network 320 and the serving network 350 may be the same or different.

Figure 4:
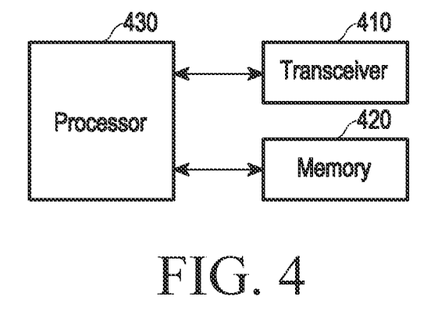
FIG. 4 is a diagram illustrating the structure of a network entity or a server according to an embodiment of the disclosure.

FIG. 4 is a diagram illustrating the structure of a network entity or server according to an embodiment of the disclosure.

Each of the network entities or servers described with reference to FIGS. 1 to 3 may include the configuration of FIG. 4. For example, the structures of an SMF, an NEF, an AF, and so on may correspond to the structure described with reference to FIG. 4. For example, structures such as a PS and a DCS may correspond to the structure described with reference to FIG. 4.

Referring to FIG. 4, a network entity or server according to an embodiment of the disclosure may include a transceiver 410, memory 420, and a processor 430. According to the above-described communication method of the network entity or server, the transceiver 410, the processor 430, and the memory 420 of the network entity or server may operate.

However, the components of the network entity or server are not limited to the above-described example. For example, the network entity or server may include more or fewer components than the afore-mentioned components. In addition, the transceiver 410, the processor 430, and the memory 420 may be implemented in the form of a single chip. Further, the processor 430 may include one or more processors.

The transceiver 410 is a generic term for a receiver and a transmitter, and may transmit and receive signals to and from a BS, a UE, a network entity, or a server. The signals transmitted and received to and from the BS, the UE, the network entity, or the server may include control information and data. For this purpose, the transceiver 410 may include a radio frequency (RF) transmitter that up-converts and amplifies the frequency of a transmitted signal, and an RF receiver that low-noise amplifies and down-converts a received signal. However, this is only an embodiment of the transceiver 410, and components of the transceiver 410 are not limited to the RF transmitter and the RF receiver.

Further, the transceiver 410 may receive a signal on a radio channel and output the received signal to the processor 430, and may transmit a signal output from the processor 430 on a radio channel.

The memory 420 may store a program and data required for the operation of the network entity or server. In addition, the memory 420 may store control information or data included in a signal obtained by the network entity or server. The memory 420 may be configured as a storage medium or a combination of storage media, such as read only memory (ROM), random access memory (RAM), hard disk, compact disk-ROM (CD-ROM), and digital versatile disk (DVD). Further, the memory 420 may be included in the processor 430, not residing separately.

The processor 430 may control a series of processes so that the network entity or server may operate according to the above-described embodiment of the disclosure. For example, the processor 430 may receive a control signal and a data signal through the transceiver 410, and process the received control signal and data signal. In addition, the processor 430 may transmit processed control signal and data signal through the transceiver 410. There may be a plurality of processors 430, and the processor 430 may execute the program stored in the memory 420 to perform a control operation for a component of the network entity or server.

Figure 5:
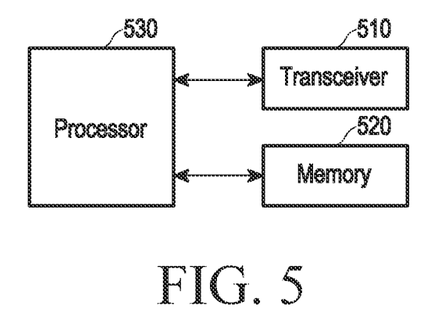
FIG. 5 is a diagram illustrating the structure of a UE according to an embodiment of the disclosure.

FIG. 5 is a diagram illustrating the structure of a UE according to an embodiment of the disclosure.

The UE described with reference to FIGS. 1 to 3 may correspond to the UE of FIG. 5. Referring to FIG. 5, the UE may include a transceiver 510, memory 520, and a processor 530. According to the above-described communication method of the UE, the transceiver 510, the processor 530, and the memory 520 of the UE may operate. For example, the UE may include more or fewer components than the afore-mentioned components. In addition, the transceiver 510, the processor 530, and the memory 520 may be implemented in the form of a single chip. Further, the processor 530 may include one or more processors.

The transceiver 510 is a generic term for a receiver and a transmitter of the UE, and may transmit and receive signals to and from a BS, a server, or another UE. The signals transmitted and received to and from the BS, the server, or the other UE may include control information and data. For this purpose, the transceiver 510 may include an RF transmitter that up-converts and amplifies the frequency of a transmitted signal, and an RF receiver that low-noise amplifies and down-converts a received signal. However, this is only an embodiment of the transceiver 510, and the components of the transceiver 510 are not limited to the RF transmitter and the RF receiver.

Further, the transceiver 510 may receive a signal on a radio channel and output the received signal to the processor 530, and may transmit a signal output from the processor 530 on a radio channel.

The memory 520 may store a program and data required for the operation of the network, entity or server. In addition, the memory 520 may store control information or data included in a signal obtained by the UE. The memory 520 may be configured as a storage medium or a combination of storage media, such as ROM, RAM, hard disk, CD-ROM, and DVD. Further, the memory 520 may be included in the processor 530, not residing separately.

The processor 530 may control a series of processes so that the UE may operate according to the above-described embodiment of the disclosure. For example, the processor 530 may receive a control signal and a data signal through the transceiver 510, and process the received control signal and data signal. In addition, the processor 530 may transmit processed control signal and data signal through the transceiver 510. There may be a plurality of processors 530, and the processor 530 may execute the program stored in the memory 520 to perform a control operation for a component of the UE.

Methods according to the claims of the disclosure or the embodiments described in the specification may be implemented in hardware, software, or a combination of hardware and software.

When the methods are implemented in software, a computer-readable storage medium storing at least one program (software module) may be provided. The at least one program stored in the computer-readable storage medium is configured to be executable by at least one processor in an electronic device. The at least one program includes instructions that cause the electronic device to perform the methods according to the claims or the embodiments of the disclosure.

The program (software module or software) may be stored in RAM, non-volatile memory including flash memory, ROM, electrically erasable programmable ROM (EEPROM), a magnetic disc storage device, CD-ROM, DVD, any other type of optical storage device, or a magnetic cassette. Alternatively, the program may be stored in memory configured as a combination of some or all of them. In addition, each constituent memory may be plural in number.

Further, the program may be stored in an attachable storage device accessible through a communication network such as the Internet, an intranet, a local area network (LAN), a wide LAN (WLAN), or a storage area network (SAN), or a combination thereof. Such a storage device may be connected to a device implementing an embodiment of the disclosure through an external port. Further, a separate storage device on the communication network may be connected to the device implementing the embodiment of the disclosure.

In the specific embodiments of the disclosure described above, elements included in the disclosure are expressed in singular or plural forms according to the specific embodiments. However, the singular or plural expression is appropriately selected in the context for convenience of description, and the disclosure is not limited to the singular or plural components. Even if a component is expressed as plural, it may be singular. Even a component expressed as singular may be plural in number.

The embodiments of the disclosure disclosed in the specification and drawings are merely presented as specific examples to easily explain the technical ideas of the disclosure and help the understanding of the disclosure, and are not intended to limit the scope of the disclosure. That is, it is apparent to those skilled in the art that other modifications can be made based on the technical spirit of the disclosure. In addition, the above embodiments may be operated in combination as needed. For example, a BS and a UE may be operated in a combination of parts of different embodiments of the disclosure. Further, the embodiments of the disclosure are applicable to other communication systems, and other modifications are also possible based on the technical spirit of the embodiments.

The invention claimed is:

1. A method by a stand-alone non-public network (SNPN) to which a user equipment (UE) is onboarding in a wireless communication system, the method comprising:
receiving, from the UE, a unique identifier of the UE configured as a network access identifier;
selecting a default credential server based on information included in realm part of the network access identifier; and
receiving, from the default credential server, address information of a provisioning server during authentication procedure for the UE.

2. The method of claim 1, further comprising selecting a session management function (SMF) and a user plane function (UPF) corresponding to the provisioning server selected by the default credential server.

3. The method of claim 1, further comprising:
transmitting, to the default credential server, an authentication request including authentication information about the UE; and
receiving, from the default credential server, a response indicating success of authentication of the UE.

4. The method of claim 1,
wherein the information included in realm part of the network access identifier is corresponding to an address of the default credential server.

5. A method by a user equipment (UE) onboarding to a stand-alone non-public network (SNPN) in a wireless communication system, the method comprising:
transmitting, to the SNPN, a unique identifier of the UE configured as a network access identifier; and performing a UE authentication procedure with a provisioning server selected by a default credential server corresponding to information included in realm part of the network access identifier.

6. The method of claim 5, wherein the information included in realm part of the network access identifier is corresponding to an address of the default credential server.

7. The method of claim 5, wherein the provisioning server is selected by the default credential server in case that the authentication procedure for the UE is successful.

8. A stand-alone non-public network (SNPN) to which a user equipment (UE) is onboarding, in a wireless communication system, the SNPN comprising:
a transceiver; and
a controller coupled with the transceiver and configured to control to:
receive, from the UE, a unique identifier of the UE configured as a network access identifier,
select a default credential server based on information included in realm part of the network access identifier, and
receive, from the default credential server, address information of a provisioning server during authentication procedure for the UE.

9. The SNPN of claim 8, wherein the controller selects a session management function (SMF) and a user plane function (UPF) corresponding to the provisioning server selected by the default credential server.

10. The SNPN of claim 8, wherein the controller controls to transmit, to the default credential server, an authentication request including authentication information about the UE, and controls to receive, from the default credential server, a response indicating success of authentication of the UE.

11. The SNPN of claim 8, wherein the information included in realm part of the network access identifier is corresponding to an address of the default credential server.

12. A user equipment (UE) onboarding to a stand-alone non-public network (SNPN) in a wireless communication system, the UE comprising:
a transceiver; and
a controller coupled with the transceiver and configured to control to:
transmit, to the SNPN, a unique identifier of the UE configured as a network access identifier, and
perform a UE authentication procedure with a provisioning server selected by a default credential server corresponding to information included in realm part of the network access identifier.

13. The UE of claim 12, wherein the information included in realm part of the network access identifier is corresponding to an address of the default credential server.

14. The UE of claim 12, wherein the provisioning server is selected by the default credential server in case that the authentication procedure for the UE is successful.

* * * * *